United States Patent Office 2,871,091
Patented Jan. 27, 1959

2,871,091
METHOD OF DISINFECTING

André Henri Passedouet, Bezons, France, assignor to Consortium de Produits Chimiques et de Synthese, Bezons, France No Drawing. Application June 9, 1954
Serial No. 435,630

Claims priority, application France June 13, 1953

1 Claim. (Cl. 21—58)

This invention relates to new germicidal compounds.

The germicidal properties of certain quaternary ammonium salts are known. In particular tetraalkylammonium salts in which one alkyl radical has a long chain such as is found in fatty material have been described as disinfectants. Quaternary ammonium salts having germicidal properties are also known, which have two alkyl chains containing from 6 to 9 carbon atoms and two alkyl radicals containing at most three carbon atoms.

It has been found possible to make new quaternary ammonium salts having very marked germicidal properties of the following general formula:

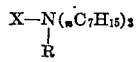

in which R represents an aliphatic hydrocarbon radical containing from 1 to 7 carbon atoms or an aralkyl radical containing from 1 to 7 carbon atoms in the alkyl group and X represents a halogen, sulphate, nitrate or methosulphate ion.

These new compounds are obtained by condensing tri-n-heptylamine with an alkyl ester or a halide such as methyl bromide, ethyl iodide, allyl bromide, benzyl bromide and methyl sulphate.

Starting from one salt it is possible to obtain another salt by double decomposition if the latter is less soluble than the original salt; for example it is possible to obtain iodides and nitrates by this method starting from chlorides and bromides. Tri-n-heptylamine, which is the starting material for the preparation of the quaternary ammonium salts of the invention, can be obtained by known means, particularly by reacting a n-heptyl halide with ammonia in the presence of an alkali.

The quaternary ammonium salts of the invention have the surprising property of forming practically no foam in contact with water, whereas the majority of the known germicidal quaternary ammonium salts have strong foam producing properties. This characteristic is of importance when it is desired to disinfect liquids, receptacles, pipes and so on, since the presence of foam is considered undesirable. This is particularly the case when disinfecting wine equipment, sterilising and washing bottles and disinfecting liquids in agitated vessels.

The quaternary ammonium salts of the invention are in general sparingly soluble in water. If it is desired to disperse them readily in water or an aqueous solution, they can be dissolved in alcohol or acetone or any other water miscible solvent in which they are soluble and this solution can be poured into the aqueous phase with agitation. Depending upon the dilution a dispersion or clear solution of high germicidal power is obtained.

The class of solvents which is particularly suitable for making such a dispersion is that of the ethylene glycol ethers and poly-ethylene glycol ethers, such as ethyl glycol, butyl glycol, phenyl diethylene glycol and beta-naphthyl hepta-ethylene glycol.

By way of comparison corresponding derivatives of tri-alkylamines closely related to tri-n-heptylamine have been examined to determine their germicidal power and have given results inferior to those obtained with the compounds of the invention.

Example 1

100 parts of n-heptyl bromide, boiling point 178–179° C., under 751 mm./Hg pressure, are heated in a steel autoclave with 50 parts of 10 N ammonia and 75 parts of caustic soda of 36° Baumé concentration to 170° C. for six hours.

The crude amine formed is decanted, washed and distilled in vacuo. The purified tri-n-heptylamine passes over at 185–195° C. under 6 mm./Hg pressure. 1 mol of this amine is reacted at room temperature with 1 mol of methyl sulphate. The reaction is exothermic.

The methyl-tri-n-heptyl ammonium metho-sulphate thus obtained is a crystalline body melting at the temperature of the hand, soluble in acetone, alcohol and dichlorethane, fairly soluble in ethyl sulphate and very sparingly soluble in water.

Example 2

Methyl-tri-n-heptylammonium methosulphate obtained according to Example 1 is dissolved in 3 parts of acetone. This solution, which is readily dispersible in aqueous medium, is employed at progressively increasing dilution of the active substance in the following nutrient medium:

| | | |
|---|---|---|
| Maltea Möser | gm | 20 |
| Gelose fragments | gm | 20 |
| Water | cc | 1000 |

After introducing the germicide into this medium, test tubes are filled and sterilised in an autoclave at 140° C. for 20 minutes. After cooling the media are inoculated with different stocks of fungi and the tubes are kept in a warm chest at 27° C. for 30 days. At the end of this time it is found that all the controls have developed prolifically. In the tubes containing at least $1/10000$ of methyl-tri-n-heptylammonium methosulphate, no development is found of *Thielaviopsis paradoxa, Coriolus versicolor* or *Aspergillus nidulans.*

Example 3

A stream of gaseous methyl bromide is passed into a suspension of 1 part of tri-n-heptylamine and 1 part of acetone. The reaction is exothermic and the mixture rapidly becomes homogeneous. The reaction is stopped when an equimolecular quantity of methyl bromide has been taken up. The acetone is distilled off on a water bath and in this way methyl-tri-n-heptylammonium bromide is obtained in the form of a viscous liquid soluble in alcohol, acetone and benzene and sparingly soluble in water. This compound is a powerful bacteriostat which at a dilution of $1/10000$ prevents the development of *Escherichia coli* in a culture medium having a base of peptonised broth.

Example 4

Methyl-tri-n-amylamine methosulphate, methyl-tri-n-hexylamine methosulphate, and methyl-tri-n-dodecylamine methosulphate are prepared by the process described in Example 1. The bacteriostatic power of these compounds is compared with that of the body described in Example 1 on *Esch. coli,* in a nutrient medium having a base of peptonised broth.

The following results are obtained:

(a) Methyl-tri-n-amylamine methosulphate: no inhibition at $1/1000$,
(b) Methyl-tri-n-hexylamine methosulphate: inhibition at $1/5000$, no inhibition at $1/10000$.
(c) Methyl-tri-n-dodecylamine methosulphate: no inhibition at $1/1000$, (d) Methyl-tri-n-heptylamine methosulphate: inhibition at 1/10000.

Example 5

310 parts of tri-n-heptylamine are reacted at 110–120° C. with 180 parts of n-heptyl bromide. In the course of the reaction the two products become homogeneous and the end of the reaction is controlled by observing acidimetrically the disappearance of the tri-n-heptylamine. Tetra-n-heptylammonium bromide is obtained in the form of a waxy body which is crystalline at room temperature. It is soluble in acetone, alcohol and benzene and insoluble in water. When dispersed in a culture medium it is found to inhibit the development of *Escherichia coli* at 1/10000 and of *Staphylococcus aureus* at 1/200000.

Example 6

1 part of methyl-n-heptylammonium methosulphate obtained according to Example 1, is dissolved in 3 parts of lukewarm beta-naphthoxy heptaethylene glycol (obtained by the addition of 7 mols of ethylene oxide to 1 mol of beta-naphthol in manner known per se). This mixture is dispersible in water in all proportions. When investigated by the method of Ross and Miles, it forms no foam in a 1% solution; on the contrary this 1% solution has a strong wetting action and has a surface tension of 26 dynes/cm. The quaternary ammonium salt rendered dispersible in this manner retains the germicidal properties of the salt itself.

What I claim is:

The method of disinfecting materials which comprises applying a solution in a water-soluble organic solvent of a salt having the formula:

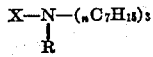

wherein X is an anion and R is selected from the group consisting of aliphatic hydrocarbon radicals containing from 1 to 7 carbon atoms and benzyl radicals to the material to be disinfected, in an amount sufficient to effect said disinfecting.

References Cited in the file of this patent

UNITED STATES PATENTS

| | | |
|---|---|---|
| 2,295,504 | Shelton | Sept. 8, 1942 |
| 2,295,505 | Shelton | Sept. 8, 1942 |

OTHER REFERENCES

Goodrich et al.: J. of Amer. Chem. Soc., vol. 72 (1950), p. 4412.